April 20, 1926.
O. COOLICAN
TOWING DEVICE
Filed July 18, 1925    2 Sheets-Sheet 1
1,581,515
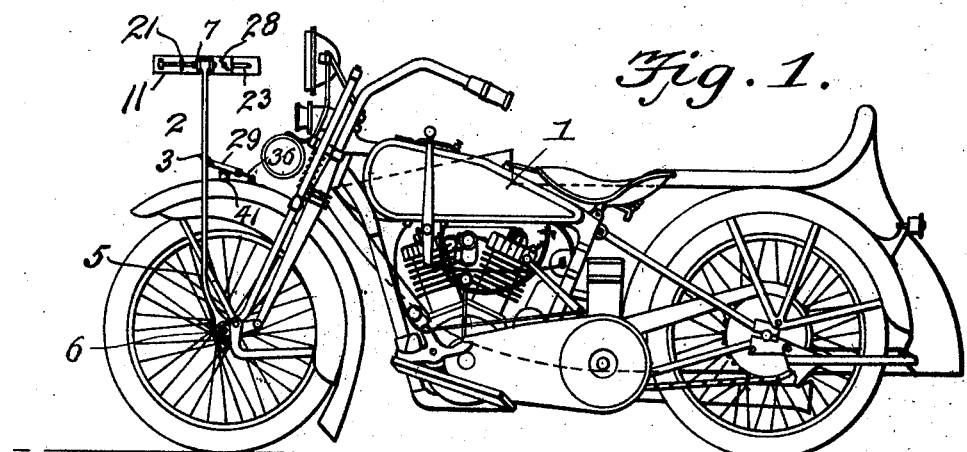
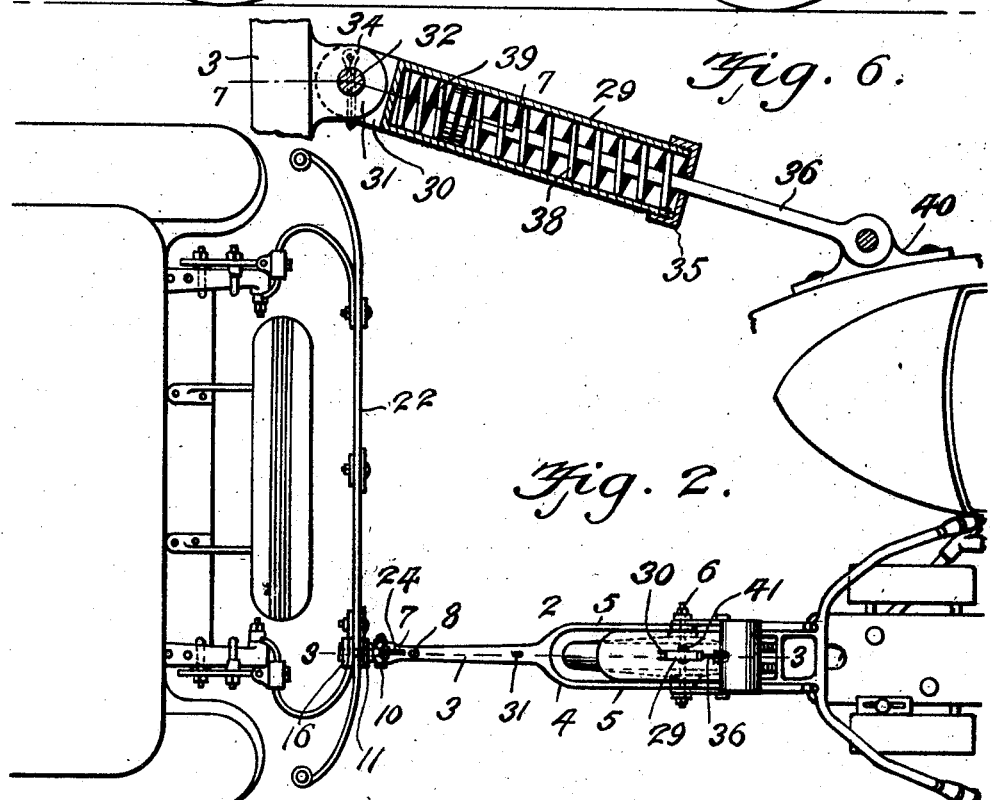
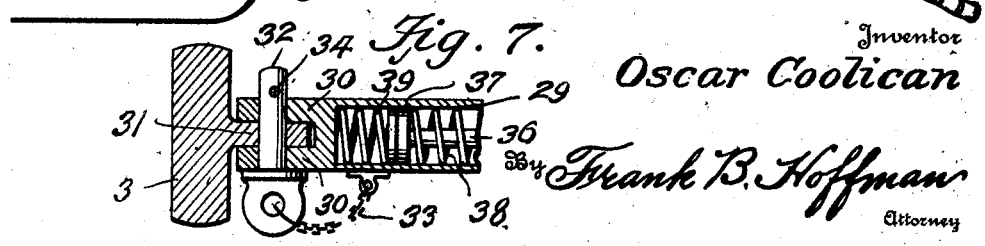
Inventor
Oscar Coolican
By Frank B. Hoffman
Attorney April 20, 1926.
O. COOLICAN
TOWING DEVICE
Filed July 18, 1925   2 Sheets-Sheet 2
1,581,515
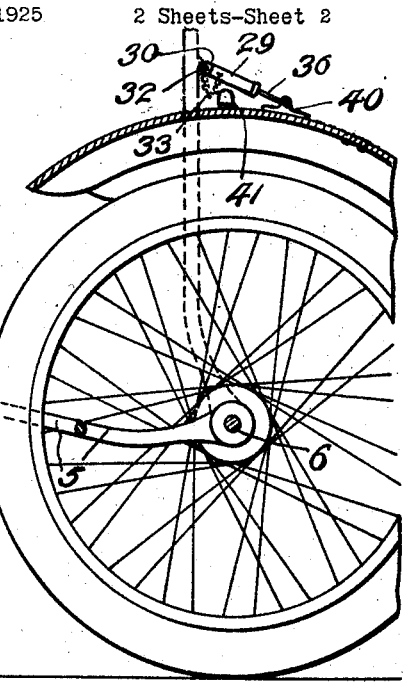
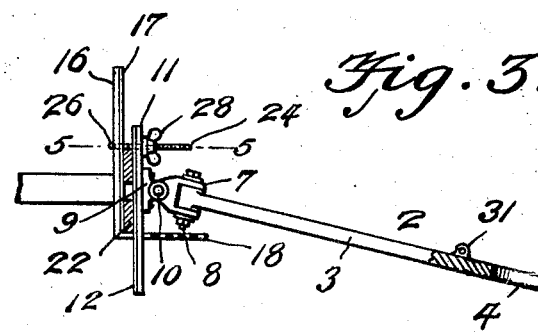
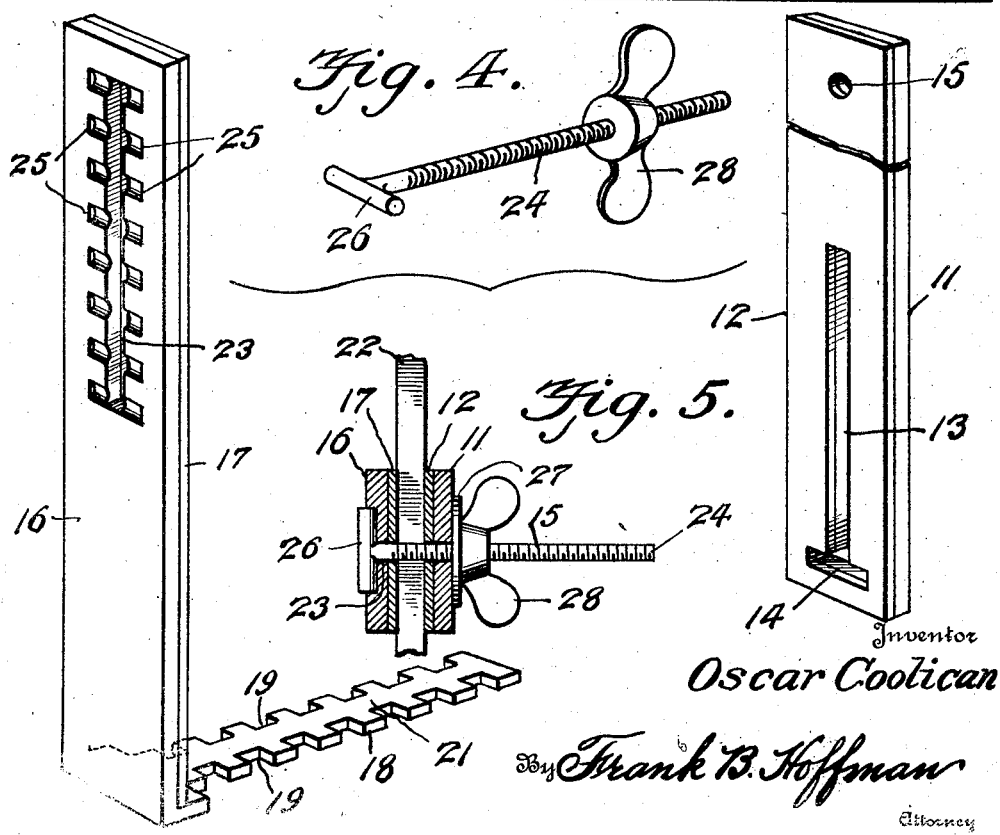
Inventor
Oscar Coolican
By Frank B. Hoffman
Attorney Patented Apr. 20, 1926.

1,581,515

UNITED STATES PATENT OFFICE.

OSCAR COOLICAN, OF WASHINGTON, DISTRICT OF COLUMBIA.

TOWING DEVICE.

Application filed July 18, 1925. Serial No. 44,587.

*To all whom it may concern:*

Be it known that OSCAR COOLICAN, a citizen of the United States, residing at 2222 Q St. N. W., in the city of Washington and District of Columbia, has invented certain new and useful Improvements in Towing Devices, of which the following is a specification.

This invention relates to towing devices and more particularly to a device for towing motorcycles of the side car type.

At present, in the operation of garages, service stations and the like, it is necessary when it is desired to send out and bring a motor vehicle back to the garage from some distant point, to utilize the services of two men, one to drive the motor vehicle back to the garage and one to transport the driver to the designated point, which in the interest of economy is accomplished by the use of a motorcycle of the side car type.

The primary object of the invention is to provide a towing means for use in connection with a motorcycle of the side car type whereby it is only necessary to utilize the services of one man instead of two in sending out for and bringing back motor vehicles to a given point.

Another object of the invention is to provide a motorcycle with a towing device adapted to be detachably connected to the rear of a motor vehicle whereby the motorcycle may be conveniently towed and without the liability of its turning over in rounding curves.

A further object of the invention is to provide a motorcycle with a towing device adapted to be quickly connected to the rear of a motor vehicle, and means for retaining the towing device in inoperative position on the motorcycle when not being used for towing purposes.

A still further object of the invention is to provide the towing device with a novel form of attaching means, whereby it can be quickly and readily detachably connected to some convenient part on the rear of the motor vehicle for towing purposes.

With these and other objects in view, the invention comprises the various novel features of construction, combination and arrangement of parts as will hereinafter appear and be shown in the accompanying drawings.

Referring to the drawings:

Figure 1 is a side elevation of a motorcycle of the side car type showing the towing device arranged in inoperative or normal carrying position.

Figure 2 is a plan view showing the towing device connected to the rear part of a motor vehicle, in this instance the rear bumper.

Figure 3 is an enlarged vertical sectional elevation, taken on the line 3—3 in Figure 2.

Figure 4 is a diagrammatic view of the attaching means or clamp, showing the various parts separated.

Figure 5 is a sectional plan view taken on the line 5—5 of Figure 3.

Figure 6 is a vertical sectional view through the resilient retaining means, arranged in operative position.

Figure 7 is a sectional plan view taken on the line 7—7 of Figure 6.

Referring to the drawings more particularly, the numeral 1 represents a motorcycle of the side car type, upon the front part of which is arranged my novel form of towing device 2. In detail, the invention comprises a draft bar 3 having one end formed to provide a fork 4, the arms 5 of which are pivotally mounted at their terminal ends on the front axle 6, so that the towing device can be readily lowered and raised when desired.

The other or forward end of the draft bar is pivotally connected to one end of a universal member 7 for lateral swinging movement by means of a bolt 8, while the opposite end of the universal member is pivotally connected to a member 9 for vertical swinging movement by a bolt 10.

By particular reference to Figure 3, it will be seen that the member 9 is rigidly carried by the female member 11 of a clamping means whereby the draft bar can be detachably connected to the rear bumper or some other suitable part of a motor vehicle for towing purposes. 12 is a facing of leather or other suitable material secured to the member 11 in any practicable way and adapted to prevent marring the surface of that part of the motor vehicle to which it is connected.

The lower part of the female member 11 is provided centrally with vertical slot 13 terminating at its lower end in a cross slot 14, while the upper part is provided with a central transverse aperture 15.

Co-operating with the female member 11 is a male member 16 also covered with a suitable facing 17 like that on the female member for the same purpose. The lower end of the male member is formed with an adjusting tongue 18 extending laterally at right angles and adapted to operate through the cross slot 14 of the female member. The opposite side edges of the tongue are provided throughout their length with aligning notches 19 of a width about equal to the thickness of the female member and the facing carried by it. These notches extend inwardly of the tongue to provide a body portion 21 of a width about equal to that of the slot 13, whereby when the tongue has been inserted through the slot 14 the desired distance, it may then be adjusted vertically. In other words, by this lateral and vertical adjustment, the clamping members 11 and 16 can be quickly brought into engagement with the sides and bottom part of the bumper 22.

The upper part of the male member 16 is provided centrally with a vertical slot 23 adapted to adjustably receive the shank of a clamping bolt 24. Aligning depressions 25 are formed on opposite sides of the slot 23 in the outer face of the male member 16 and are adapted to accommodate the T-head 26 of the clamping bolt, while the opposite end of the latter extends through the aperture 15 of the female member 11 and is provided with a bearing washer 27 and a winged nut 28.

To complete the adjustment of the clamping means, the female member is lowered until the clamping bolt rests on the upper part of the bumper bar, then the winged nut 28 is tightened until the T-head 26 rests in the adjacent depressions 25 and the male and female members are clamped tight against the sides of the bumper bar. To detach the clamping means, it is merely necessary to loosen the nut 28, disengage the T-head 26 from the depressions 25, then rotate the T-head into alignment with the slot 23 so that when the tongue 18 has been lowered to the cross slot 14, the two parts of the clamping means can be readily pulled apart. After detachment, the parts may then be reassembled until it is desired to use them again.

By virtue of clamping means of the above described character, it will be seen the adjustment is of such a large range that the clamping means can be quickly and readily connected to any convenient part on the rear of a motor vehicle, irrespective of the particular shape of the part to which it is connected. While I have described one particular form of clamping or attaching means, I desire to have it understood that any other form of attaching means may be used as is within the scope of the invention.

When the towing device is not in use, it is normally carried in a fixed upright position on the front of the motorcycle as shown in Figure 1. To hold the device in this position, suitable resilient retaining means is provided which in this instance consists of a cylindrical tube 29 having a pair of spaced ears 30 on its upper or outer end adapted to embrace an apertured ear 31 carried by the draft bar 3. A removable pivot pin 32 is used to pivotally connect the ears 30 and 31 and is connected to the tube 29 by a flexible element 33 to prevent its being lost. 34 is a cotter key extending through an aperture in the outer end of the pin to hold it in operative position. The lower end of the tube 29 is closed by a screw cap 25.

Slidably arranged within the tube 29 and through the cap 35 is a plunger rod 36 having a head 37. Compression springs 38 and 39 are positioned in the tube 29 on opposite sides of the plunger head 37 and serve to cushion the towing device under normal riding conditions. The lower end of the plunger rod is pivotally connected to a hinge member 40 fixed to any suitable part of the motorcycle. 41 is a U-shaped spring retaining member fixed to the motorcycle fender or other appropriate part adapted to receive and hold the tube 29 in inoperative position while the towing device is being used for towing.

From the foregoing description, the advantages of construction, and the method of operation will be readily apparent to one skilled in the art to which the invention relates, and while I have described the principle of operation of the invention, together with the device which I now consider to be the best embodiment thereof, I desire to have it understood that such changes may be made as are within the scope of the appended claims.

I claim:

1. In combination with a motorcycle of the side car type, a towing device permanently mounted upon the motorcycle, means for connecting the towing device to a motor vehicle for towing the motorcycle, and means for holding the towing device when not in use in upright position on the motorcycle.

2. In combination with a motorcycle of the side car type, a towing device pivotally mounted upon the motorcycle, means for detachably connecting the towing device to a motor vehicle for towing the motorcycle, and resilient means carried by the motorcycle adapted to be connected to the towing device for holding it up in inoperative position on the motorcycle.

3. In combination with a motorcycle, a towing device pivotally mounted on the front axle of the motorcycle, means for detachably connecting the towing device to a vehicle for towing the motorcycle, and means carried by the mud guard of the motorcycle adapted to hold the towing device when swung into upright position.

4. In combination with a motorcycle of the side car type, a towing device pivotally mounted upon the motorcycle, means for detachably connecting the towing device to a motor vehicle for towing the motorcycle, means embodied within the towing device to permit of vertical and lateral movement of the device when arranged in operative position, and shock absorbing means for holding the towing device in upright position and cushioning vibration of said device under riding conditions.

5. In combination with a motorcycle of the side car type, a towing device pivotally mounted on the motorcycle, means for connecting the towing device to a motor vehicle, and resilient retaining means for holding the towing device when not in use in upright position, said resilient retaining means adapted also to cushion the device under normal riding conditions.

6. In combination with a motorcycle of the side car type, a towing device comprising a draft bar having one end bifurcated to provide fork arms, the terminal ends of said fork arms being pivotally mounted upon the front axle, attaching means carried by the other end of the draft bar whereby the device may be connected to a motor vehicle, and resilient retaining means for holding the draft bar when not in use in an upright position.

7. In combination with a motorcycle of the side car type, a towing device comprising a draft bar having one end bifurcated to provide fork arms, the terminal ends of which are pivotally mounted upon the front axle, a universal joint carried by the free end of the draft bar, attaching means fixed to the universal joint adapted to be connected to a motor vehicle, and resilient retaining means for holding the draft bar when not in use in an upright position on the motorcycle.

8. In combination with a motorcycle of the side car type, a towing device comprising a draft bar having one end bifurcated to provide fork arms, the terminal ends of which are pivotally mounted on the front axle, a universal joint carried by the free end of the draft bar, adjustable attaching means fixed to the universal joint whereby it may be attached to any suitable part of a motor vehicle for towing, and resilient retaining means for holding the draft bar when not in use in an upright position on the motorcycle.

9. In a towing device of the character described, adjustable attaching means comprising male and female members, and means for adjustably connecting said members together.

10. In a towing device of the character described, adjustable attaching means comprising male and female members, means for connecting said members together, and means for adjusting said members laterally and vertically with respect to each other.

11. In a towing device of the character described, adjustable attaching means comprising male and female members, a nonmetallic facing carried by each of said male and female members, means for adjustably connecting said members together, and means for adjusting said members laterally and vertically with respect to each other.

12. In a towing device of the character described, adjustable attaching means comprising a female member provided in its lower part with an inverted T-shaped slot and in its upper end with an aperture, a male member formed with an angular extending notched tongue on its lower end adapted for lateral and vertical adjustment in said inverted T-shaped slot of the female member and a slot in its upper part, the outer face of said member also being formed with aligning depressions on opposite sides of the slot, a clamping bolt having a T-head adapted to be adjustably positioned in said aligning depressions, said bolt extending through the slot of the male member and the aperture of the female member, and a nut on the free end of the clamping bolt whereby the male and female members may be rigidly clamped together when arranged in relative adjusted position.

13. In combination with a motorcycle of the side car type, a towing device comprising a draft bar having one end bifurcated to provide fork arms, the terminal ends of which are pivotally mounted on the front axle, a universal joint connected to the outer end of the draft bar, attaching means fixed to the universal joint, and resilient cushioning means fixed to the motorcycle and adapted to be connected to the draft bar when raised to an upright position to hold the device in an effectual inoperative position.

14. In a towing device of the character described, the combination with a motorcycle, of a draft bar pivotally mounted on the front axle for vertical swinging movement, an apertured ear carried by the draft bar, a cylindrical tube having a pair of spaced ears on its upper end adapted to embrace said apertured ear, a removable pivot pin for connecting said ears together, a cap closing the lower end of said cylindrical tube, a plunger rod having a head slidably mounted in said tube, compression springs arranged in said tube on opposite sides of the plunger head, means for pivotally connecting the outer free end of the plunger rod to the motorcycle, and means carried by the motorcycle for retaining the cylindrical tube in inoperative position.

15. In a towing device of the character described, the combination with a motorcycle, of a draft bar pivotally mounted on the front axle for vertical swinging movement, a cylindrical tube, a cap closing one end of said cylindrical tube, a plunger rod having a head slidably mounted in said tube, compression springs arranged in said tube on opposite sides of said head, means for pivotally connecting the outer free end of the plunger rod to the motorcycle, means for detachably connecting the outer free end of the cylindrical tube to said draft bar when swung into upright position, and a U-shaped spring carried by the motorcycle adapted to receive and hold the cylindrical tube when disconnected from the draft bar.

In testimony whereof I affix my signature.

OSCAR COOLICAN.